United States Patent [19]
Garcia

[11] Patent Number: 5,474,389
[45] Date of Patent: Dec. 12, 1995

[54] LOW FRICTION ROLLER BEARING

[75] Inventor: Teofilo A. Garcia, Oakville, Conn.

[73] Assignee: The Torrington Company, Torrington, Conn.

[21] Appl. No.: 359,255

[22] Filed: Dec. 19, 1994

[51] Int. Cl.[6] .............................. F16C 33/46; F16C 33/66
[52] U.S. Cl. ........................ 384/572; 384/470; 384/552; 384/574
[58] Field of Search ..................................... 384/574, 572, 384/552, 494, 470

[56] References Cited

U.S. PATENT DOCUMENTS

| | | | |
|---|---|---|---|
| 53,023 | 3/1866 | Mead | 384/552 |
| 567,451 | 9/1896 | Bradley | 384/552 |
| 687,954 | 12/1901 | Eveland | 384/574 |
| 776,773 | 12/1904 | Blakely | 384/574 |
| 861,592 | 7/1907 | Johnson | 384/552 |
| 1,005,041 | 10/1911 | Johnson | 384/574 |
| 1,149,542 | 8/1915 | Risley | 384/552 |
| 1,367,006 | 2/1921 | Baumler | 384/572 |
| 1,426,038 | 8/1922 | Burkholder | 384/572 |
| 1,455,981 | 5/1923 | Zupnik | 384/574 |
| 1,543,039 | 6/1925 | Vervoort | 384/552 |
| 1,622,618 | 3/1927 | Vervoort | 384/574 |
| 2,096,321 | 10/1937 | Cox | 384/574 X |
| 2,231,350 | 2/1941 | Ringle | 384/574 |

FOREIGN PATENT DOCUMENTS

| | | | |
|---|---|---|---|
| 224426 | 11/1924 | United Kingdom | 384/552 |

Primary Examiner—Thomas R. Hannon
Attorney, Agent, or Firm—John C. Bigler

[57] ABSTRACT

There is provided a roller bearing having inner and outer annular roller races, each race having a bearing raceway that is spaced from and opposes the bearing raceway of the other race, and a rigid frame for retaining a complement of rollers arranged between the roller races. The rigid frame includes annular end plates having a series of concave seats and a plurality of spacers mounted at right angles to each of the end plates. A complement of axially extending rollers is arranged in the frame and the frame is positioned between the races and in rolling contact with the bearing raceways. Spherical balls or convex sphere built into the roller are provided between the ends of the rollers and each end plate for reducing friction between the roller ends and the end plates while piloting the rollers in such a way as to maintain alignment.

11 Claims, 1 Drawing Sheet

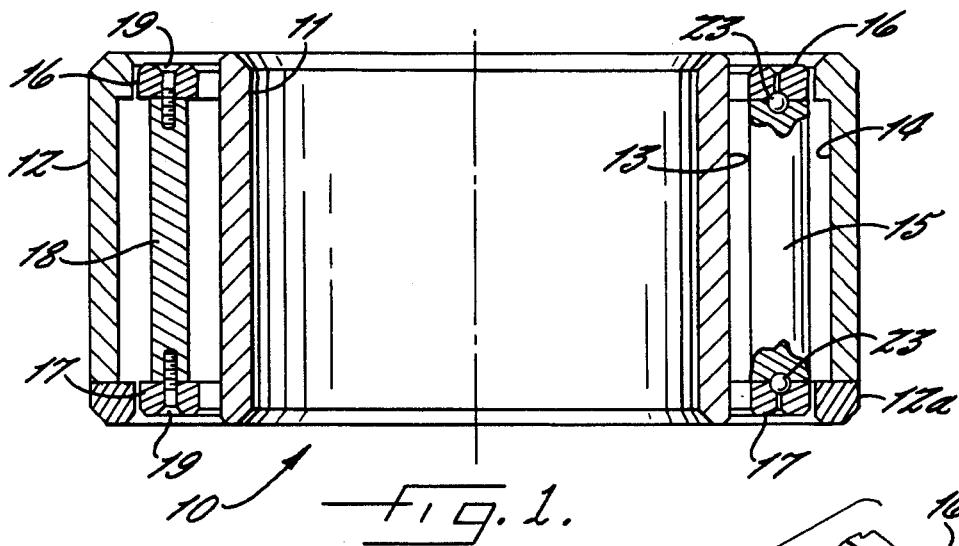
fig. 1.
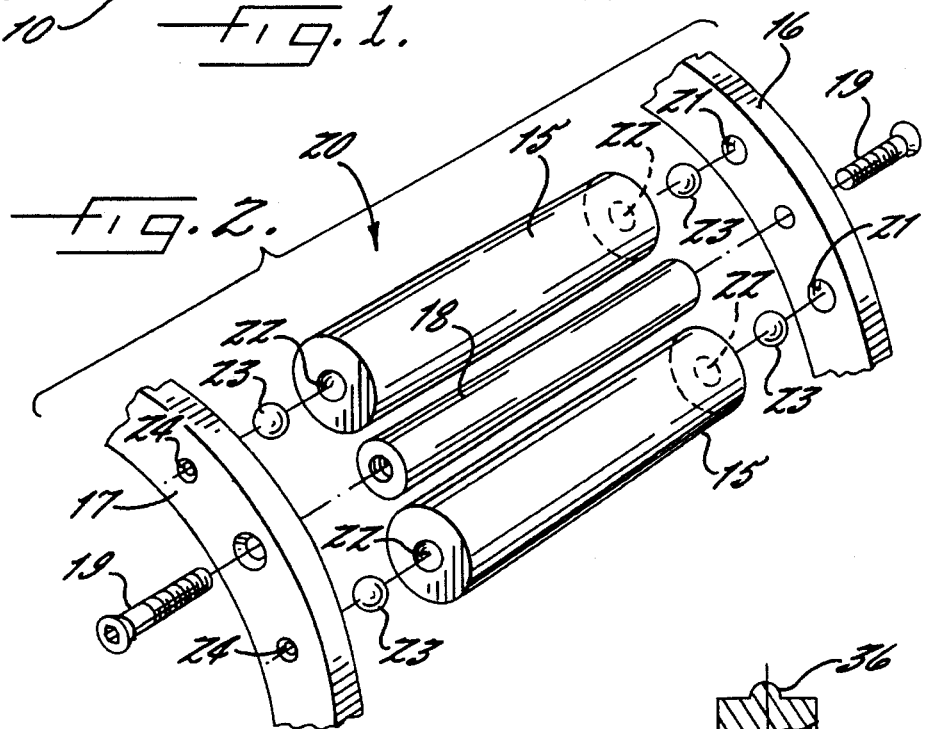
fig. 2.
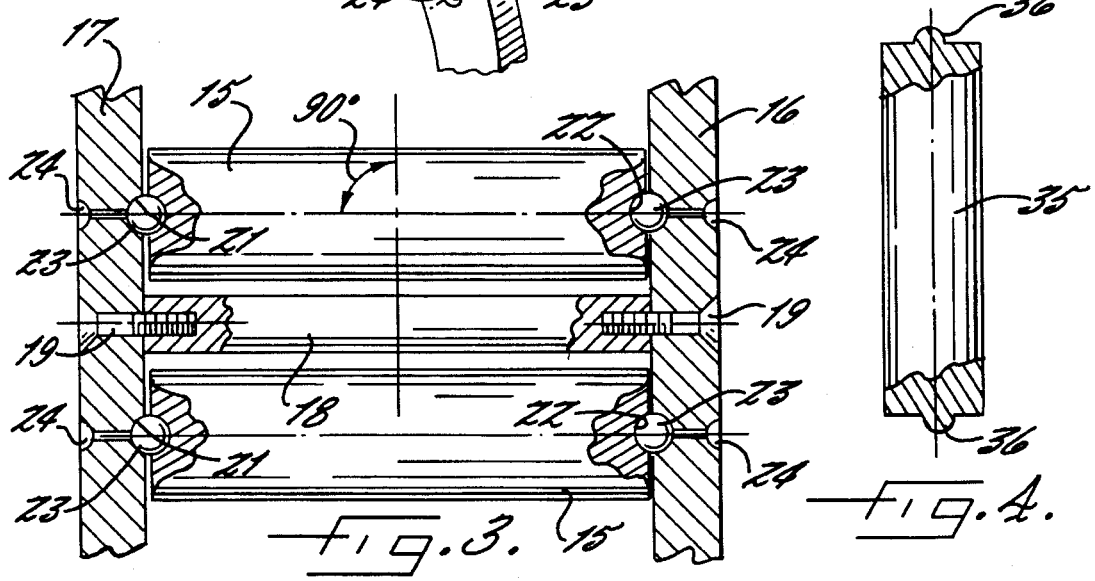
fig. 3.
fig. 4.

LOW FRICTION ROLLER BEARING

BACKGROUND OF THE INVENTION

This invention relates generally to means for providing a low friction roller bearings, and more particularly to an improved rigid roller frame for low friction tracking devices for a roller bearing.

Roller bearings are ideally suited for many types of equipment, particularly for traveling blocks, swivels, rotary drives and the like. One type of roller bearing cage or frame construction provides end plates that are held together in spaced apart relationship by rigid bars which also maintain the spacing between adjacent rollers. A complement of rollers is placed within the frame. The cage or frame is positioned between inner and outer roller races where the rollers are in rolling contact with the bearing surfaces of both inner and outer races. The ends of the rollers exert axial thrust against the frame end plates causing friction. In addition, when the bearing is being used the rollers tend to skew or become slightly misaligned resulting in poor performance.

The roller must be restrained axially to maintain proper alignment with the inner and outer races and to prevent excess wear to the roller ends and the end plates. There should be as little friction as possible. A bearing frame having a concave seat in the end plates of the rigid frame and a spherical ball inserted between the roller end and the concave seat in the end plate has been previously used. While this arrangement has the benefit of somewhat lower friction, the hardened steel balls between the flat end of the roller and the frame seat lessen wear at the ends of the rollers but do not provide the means to maintain the rollers in alignment. In roller bearings having tapered or conical rollers there has been provided a cage having different sized, spaced-apart end plates held together by rigid bars, and frusto-conical roller bearings having rollers provided at each end with radial elongated ball seats and balls seated in the ends of each roller as well as seated in elongated seats in each end wall. However, such cages, because the ball seats are elongated, do not provide for accurate piloting of the rollers.

The foregoing illustrates limitations known to exist in present roller bearings. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a roller bearing having inner and outer annular roller races each having a bearing surface that is spaced from and opposes the bearing surface of the other race and a rigid frame for retaining a complement of rollers arranged between and in rolling contact with each of said roller races. The rigid roller frame is provided to maintain the spacing between adjacent rollers and to provide means for reducing friction and maintaining the rollers in alignment. The rigid frame is held in spaced apart relationship by spacers mounted at right angles to each end plate. Each end plate has a series of concave ball seats located adjacent to the center of the end of each roller. A complement of rollers are mounted between the end plates at right angles thereto, each roller having a concave ball seat in the center of each end. Balls are positioned between the ball seats in the roller ends and the respective ball seats in the end plates. This arrangement provides a low friction between the roller, the ball and the end plate. The ball seats also provide the means to maintain the bearing rollers in alignment, e.g., pilot the rollers at right angles to the direction of travel of the races. In an alternative embodiment, each roller has a convex semi-spherical boss machined at the center of each roller end. The semi-spherical boss is seated in a concave ball seat in the respective end plate. The boss serves the same function as the ball.

In another aspect of this invention, a rigid roller frame is provided for use in a roller bearing having inner and outer arcuate roller races each having a bearing surface that is spaced from and opposite the bearing surface of the other race so as to accommodate the rigid frame and the rollers contained therein in rolling contact with the bearing raceways. Such frame allows the roller bearing to provide positive tracking of the roller complement and to reduce friction.

The foregoing and other aspects will become apparent from the following detailed description of the invention when considered in conjunction with the accompanying drawing figures.

BRIEF DESCRIPTION OF THE DRAWING FIGURES

FIG. 1 is a cross-sectional view illustrating an embodiment of a roller bearing including the roller frame of the present invention;

FIG. 2 is an exploded partial perspective view of a portion of the roller frame of the present invention;

FIG. 3 is an enlarged cross-sectional view of the rigid roller frame showing partial cutaways of the friction reducing means; and FIG. 4 is a cross-sectional view illustrating an alternative embodiment of a roller which may be used in the roller bearing frame of the present invention.

DETAILED DESCRIPTION

The present invention is to a roller bearing having a rigid roller frame. Referring now to the drawings, FIG. 1 illustrates one aspect of the present invention in which there is shown a cross-sectional view of a roller bearing 10 including inner and outer annular races 11 and 12, respectively. The inner and outer races 11 and 12 are provided with respective bearing raceways 13 and 14. The outer race 12 may include separate end plate 12a to allow raceway 14 to be recessed, as shown. Disposed between and in rolling contact with the bearing raceways 13 and 14 are a complement of rollers 15 mounted in rigid roller frame 20, illustrated in FIG. 2.

The rigid roller frame 20 includes annular end plates 16, 17 which are held in spaced apart relationship by a series of spacers, such as rods or posts 18, anchored at right angles to each end plate by any convenient means, such as by welding, riveting or by screws 19 or a combination of means. A complement of cylindrical rollers 15 are mounted between annular end plates 16 and 17. The spacers 18, in addition to maintaining the end plates spaced apart, maintain the spacing between adjacent rollers 15. The annular end plates are preferably of equal diameter. Each end plate 16, 17 has a concave ball seat 21 adjacent the end of each roller 15. The concave ball seat 21 is preferably spherical but may be conical instead of spherical for greater lubrication retention. This arrangement serves to assist in maintaining alignment of the rollers with respect to the direction of travel of the raceways.

Each roller 15 has a friction reducing means at each end. As shown in the embodiment of FIG. 2, a ball seat 22 is located in the center of each end of each roller 15. The face of concave ball seat 22 is circular to accommodate a ball 23. The shape of the ball seat may be spherical or conical or any suitable shape that will accommodate the ball 23 in a manner that there is little friction between the ball and the seat. A ball 23 is mounted between each end of each roller 15 and the respective end plate 16 or 17 and is positioned in the respective ball seat 21, 22. The balls 23 maintain the spacing between the roller ends and the end plates 16, 17. As shown in FIG. 3, the rollers 15 are positioned in the ball seats at a 90° angle to the raceway center line of travel. The balls 23 pilot or guide the rollers 15 so as to prevent misalignment or skewing. The completed roller frame provides positive tracking, i.e., alignment of the roller complement to eliminate skew or misalignment at right angles to the direction of travel of the respective raceways 13, 14. The balls 23 are lubricated through holes 24 provided through each of the end plates 16, 17 at each ball seat location thereby resulting in little friction during bearing use.

In addition, the present invention may employ, as an alternative, the embodiment shown in FIG. 4, a roller 35 having a convex spherical boss 36 machined at the center of each roller end. In this embodiment, the rigid frame 20 is assembled with the spherical roller bosses 36 seated in end plate concave seats 21 in each of the end plates 16, 17.

From the above description, it will be apparent that the present invention provides a roller bearing having a rigid frame containing a complement of cylindrical rollers arranged to maintain the rollers in alignment while producing little friction to significantly reduce wear of the roller ends and end plates.

While this invention has been illustrated and described in accordance with preferred embodiments, it is recognized that other variations and changes may be made therein without departing from the invention as set forth in the claims.

Having described the invention, what is claimed is:

1. A roller bearing comprising:
   inner and outer annular roller races each having a bearing raceway that is spaced from and opposes the bearing raceway of the other race and a rigid frame for retaining a complement of rollers disposed between said roller races and in rolling contact with the bearing raceway, said rigid frame comprising:
   annular end plates each having an open interior area to accommodate a shaft therethrough and being of equal diameter having a series of concave seating means and a plurality of spacers mounted at right angles to each of said end plates for retaining a complement of rollers mounted therebetween;
   a complement of axially extending cylindrical rollers retained between said end plates and in rolling contact with the raceways of inner and outer annular races;
   means for reducing friction between each of said roller ends and said end plates, said friction reducing means being seated in said end plate seating means, whereby said rollers are maintained in alignment, and
   means for lubricating said friction reducing means through each of said annular end plates at each seating means location.

2. The roller bearing according to claim 1, wherein each of said rollers has a concave ball seat at each end and said friction reducing means is a ball seated in said roller concave seat and said end plate seat means.

3. The roller bearing according to claim 1, wherein said friction reducing means comprises a convex sphere built into each end of said roller and adapted to rest in the concave seat in each end plate.

4. The roller bearing according to claim 1 wherein said rollers are cylindrical.

5. The roller bearing according to claim 1, wherein said outer race comprises an end plate and said outer raceway is recessed.

6. The roller bearing according to claim 1, wherein said series of concave seating means are conical in shape for greater lubrication retention.

7. A rigid roller frame for use in a roller bearing having inner and outer annular roller races each having a bearing raceway that is spaced apart from and opposes the bearing raceway of the other race, said rigid frame being disposed between said roller races providing positive tracking of a complement of rollers, comprising:
   annular end plates each having an open interior area to accommodate a shaft therethrough and being of equal diameter having a series of concave seating means and a plurality of spacers mounted at right angles to each end plate for retaining a complement of rollers mounted therebetween;
   a complement of axially extending rollers retained said end plates and adapted to be in rolling contact with said raceways;
   means for reducing friction between each of said roller ends and said end plates, said friction reducing means being seated in said end plate seating means, whereby said rollers are maintained in alignment; and
   meads for lubricating said friction reducing means through each of said annular end plates at each seating means location.

8. The rigid roller frame according to claim 7, wherein each of said rollers having a concave ball seat at each end and said friction reducing means is a ball seated in said roller concave seat and said end plate seat means.

9. The roller bearing assembly according to claim 7, wherein said friction reducing means comprises a convex sphere built into each end of said roller and adapted to rest in the concave seat in each end plate.

10. The roller bearing assembly according to claim 7 wherein said rollers are cylindrical.

11. The rigid roller frame according to claim 7, wherein said series of concave seating means are conical in shape for better lubrication.

\* \* \* \* \*